United States Patent [19]

Gardner

[11] 3,934,952

[45] Jan. 27, 1976

[54] LEAKPROOF SEAL FOR BEARINGS

[75] Inventor: Willis W. Gardner, Waukesha, Wis.

[73] Assignee: Waukesha Bearings Corporation, Waukesha, Wis.

[22] Filed: Jan. 24, 1975

[21] Appl. No.: 543,722

[52] U.S. Cl. ............. 308/36.1; 115/34 R; 308/122; 308/DIG. 12
[51] Int. Cl.² .......................................... F16C 1/24
[58] Field of Search .......... 308/36.3, 92, 36.1, 36.5, 308/121, 122, 123, 76, DIG. 12; 184/1 R; 115/34 R

[56] References Cited
UNITED STATES PATENTS

| 3,565,447 | 2/1971 | Joachim et al. | 115/34 R |
| 3,787,105 | 1/1974 | Gardner | 308/36.1 |
| 3,863,737 | 2/1975 | Kakihara | 308/DIG. 12 X |
| 3,889,626 | 6/1975 | Kakihara | 308/DIG. 12 |

Primary Examiner—M. H. Wood, Jr.
Assistant Examiner—Gene A. Church
Attorney, Agent, or Firm—Arthur L. Morsell, Jr.

[57] ABSTRACT

An annular liquid collecting chamber is provided between the aft end of a stern tube bearing for a ship's propeller shaft and the forward end of the aft stern tube seal. A floating seal ring at the aft end of the stern tube bearing retains oil in the bearing but there is leakage of a small percentage of oil into the collecting chamber. A scavenge pump is coupled to the bottom of the collecting chamber to remove any fluids that collect therein. The oil in the output of the scavenge pump is coalesced and pumped to the stern tube oil sump tank to be recycled. The aft stern tube seal includes at least three seal rings whose lips are all directed outboard. Filtered sea water is pumped into a first annular space between two of the seal rings and circulates in an outboard direction to cool and lubricate the rings and wash away any dirt. Filtered sea water at a lower pressure is applied to an annular space which is forward of the first space to lubricate the rings and to lower the pressure drop across an intermediate ring. In certain installations where there is a projecting strut, there may be collecting from both ends of the bearing.

16 Claims, 3 Drawing Figures

3,934,952

LEAKPROOF SEAL FOR BEARINGS

BACKGROUND OF THE INVENTION

This invention relates to lubricated bearing and seal assemblies for ship propeller shafts, or for other shafts that are similarly lubricated and sealed. In the past, the stern tube bearing for a ship's propeller shaft has been flood lubricated, and the space between the aft end of the stern tube bearing and the aft stern tube seal was filled with oil. The lip of the innermost seal ring has been directed in an inboard direction and served to seal in the oil while the lips of the other seal rings were directed in an outboard direction and served to seal the water out.

These prior art seals have been effective, but since no seal is perfect, there was always the probability of a small amount of oil leakage through the aft stern tube seal even when it was new, the amount of leakage increasing as the seal rings deteriorated in service. Although this leakage was normally quite small, it was sufficient to leave a visible sheen on the water behind the ship.

Recently, maritime authorities concerned with navigation on the Great Lakes have required ship owners to so reduce oil leakage from their ships that no oil sheen is visible around the ship or in its wake. This requirement has posed a difficult seal design problem, since even minute quantities of oil leakage can cause a visible sheen.

SUMMARY OF THE INVENTION

In accordance with this invention, the above-noted problem is solved not by improving the seals, but rather by providing an annular liquid collecting chamber between the aft end of the stern tube bearing and the aft stern tube seal and by removing liquid from the collecting chamber as fast as it accumulates therein to keep the collecting chamber at low pressure, there being a floating seal ring on the aft end of the stern tube bearing to limit leakage, any leakage liquid being removed as fast as it accumulates and being coalesced and recirculated.

This invention may also include an improved aft stern tube seal which has a plurality of seal rings having lips which are all directed outboard, means for pumping water into a space between two of the seal rings at a pressure higher than the sea water pressure on the outboard seal lip so as to flush the water outboard under at least one seal lip, and means for applying water at a lower pressure into the space between two seal rings inboard of the first-mentioned space to reduce the pressure drop across the inboard seal ring adjacent to the first-mentioned space. In one form of the invention for use when there is a projecting strut bearing, there may be the improved seal construction at each end of the bearing and there is collecting of fluid at both ends.

It is, therefore, a general object of the present invention to provide a seal for bearings which prevents leakage of oil onto the surface of the water and which has means for withdrawing any leakage fluids, coalescing the same, and recirculating collected leakage oil for reuse.

DESCRIPTION OF THE PREFERRED EMBODIMENT

Figure 1:
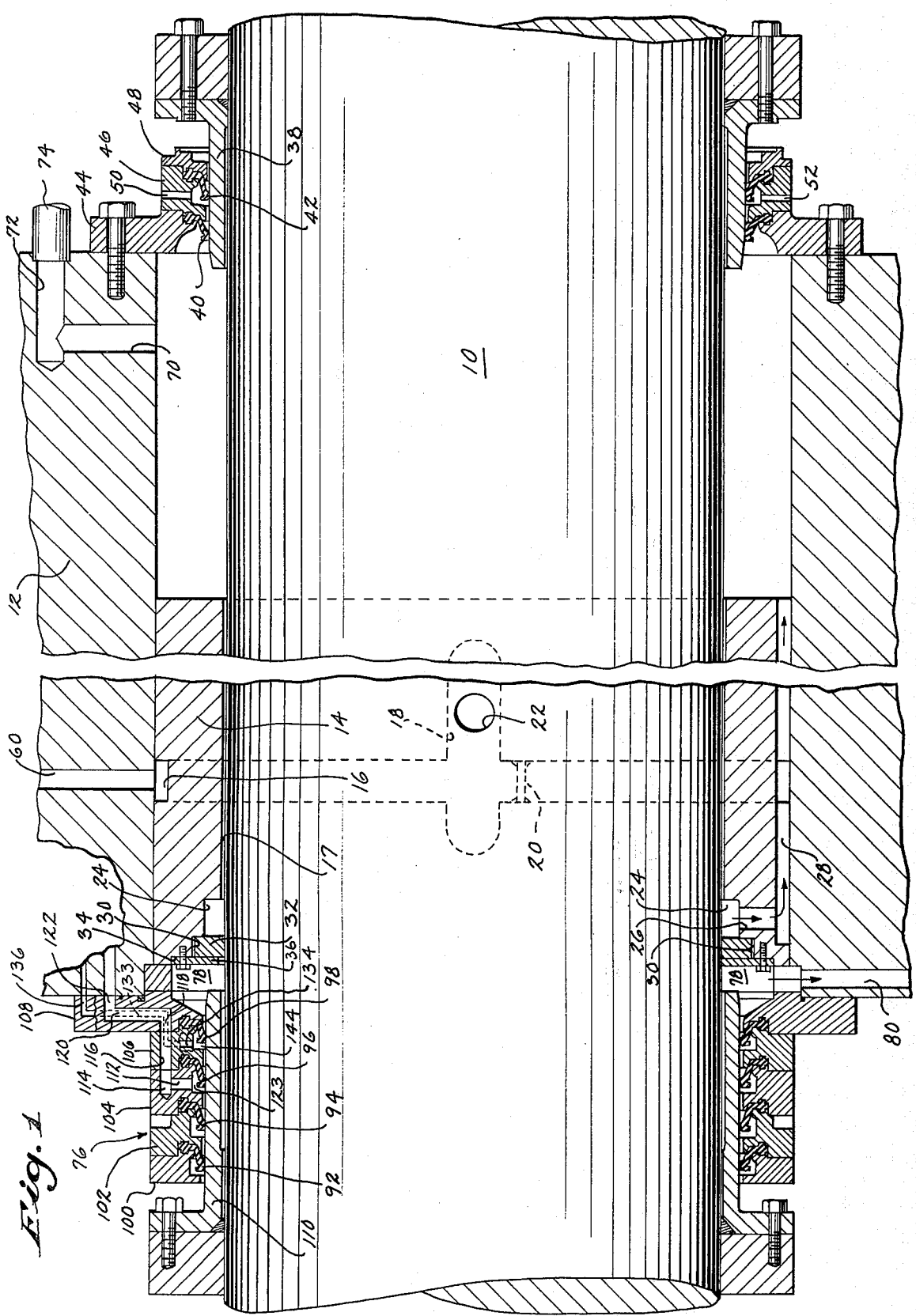
FIG. 1 is a longitudinal sectional view of a stern tube bearing and stern tube seals for a ship propeller shaft.

Referring to FIG. 1, the aft portion of a ship's propeller shaft 10 is shown enclosed within a stern tube 12 and surrounded by a bearing sleeve 14 which is supported by stern tube 12. Bearing sleeve 14 has a circumferentially-extending oil groove 16 formed in its outer surface and a plurality of axially-extending oil grooves 18 which intersect groove 16. Dams 20 close circumferential groove 16 under the junction of each axial groove 18 to divert oil from groove 16 into grooves 18. Radially-extending oil ducts 22 connect with grooves 18 to direct the oil from grooves 18 into the space 17 between propeller shaft 10 and bearing sleeve 14 to lubricate shaft 10.

An internal annular oil chamber 24 is formed in the aft end of bearing sleeve 14 to collect oil discharged from the aft end of bearing sleeve 14. A radially-extending oil recirculation duct 26 communicates with oil chamber 24 and with an axially-extending oil groove 28 formed on the exterior of bearing sleeve 14 and extending from duct 26 to the forward end of bearing sleeve 14 to recirculate the oil collected in oil chamber 24. The above is generally conventional.

The aft end of bearing sleeve 14 has an annular groove 30 receiving a floating bronze seal ring 32 and is annularly recessed at 34 to receive a retaining ring 36 for the seal ring 32. Retaining ring 36 is secured to the aft end of bearing sleeve 14 by any suitable fastening means.

There is a small clearance between seal ring 32 and propeller shaft 10, and, as a consequence, there is some leakage of oil past seal ring 32. This leakage oil is taken care of by novel apparatus described hereinafter.

At the forward end of stern tube 12, the space between tube 12 and propeller shaft 10 is sealed by a conventional forward stern tube seal that includes a forward shaft liner 38, which is attached to shaft 10 by conventional means, and a pair of resilient seal rings 40 and 42 which are supported by conventional mounting rings 44, 46 and 48 on the forward end of stern tube 12 and bear against liner 38 with their lips directed outboard to seal the oil in. Mounting ring 46 has a bore 50 extending therethrough to admit oil into the space between seal rings 40 and 42 to reduce the pressure across ring 40 and to lubricate seal rings 40 and 42. A similar bore 52 is formed in the bottom of mounting ring 46 for the same purpose.

Figure 2:
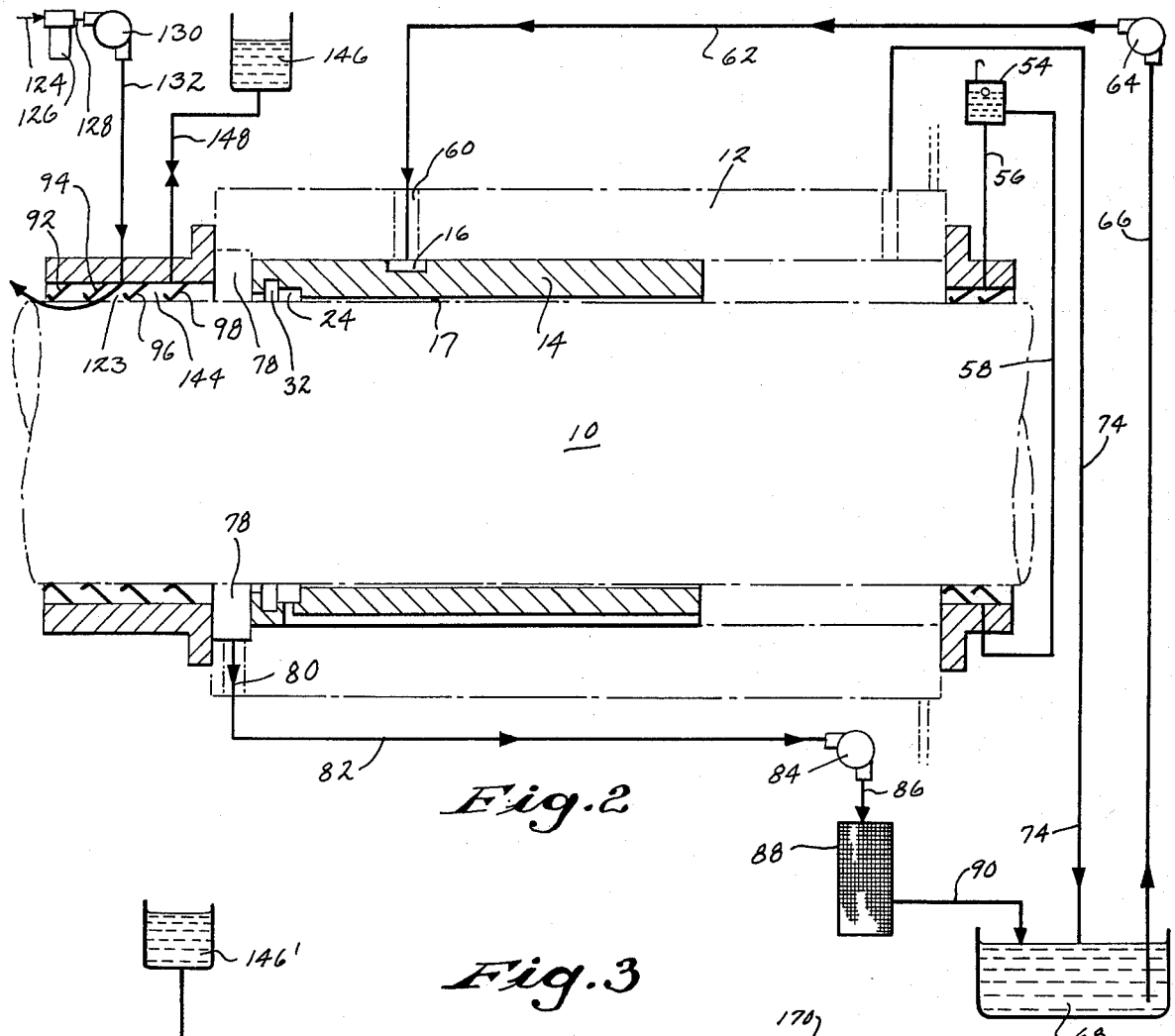
FIG. 2 is a block diagram of the oil and water circulation systems for the bearing and seals shown in FIG. 1.

As shown in FIG. 2, an oil head tank 54 is coupled to bores 50 and 52 by conduits 56 and 58 respectively to introduce oil into the space between sealing rings 40 and 42.

An oil inlet bore 60 (FIG. 1) in stern tube 10 communicates with circumferential oil groove 16 of bearing sleeve 14. Oil under pressure is supplied to oil inlet bore 60 by conduit 62 (FIG. 2) which is coupled to the output of an oil pump 64. Another conduit 66 is coupled between the input of pump 64 and an oil sump tank 68. Two bores 70 and 72 (FIG. 1) and a conduit 74 (FIG. 2) provide an oil return path from the forward end of stern tube 12 to oil sump tank 68.

The principal object of this invention is to eliminate oil leakage through the aft stern tube seal 76 (FIG. 1). This is done by providing an annular liquid collecting chamber 78 between the aft end of bearing sleeve 14 and the aft stern tube seal 76 and by removing the liquid from chamber 78 fast enough to keep it substantially empty. Such removal takes place through a bore 80 in stern tube 12 at the bottom of chamber 78 and through a conduit 82 (FIG. 2) which is coupled between bore 80 and the input of a scavenge pump 84. The output of scavenge pump 84 is coupled via conduit 86 to a coalescer 88 or other purifier which separates water and other impurities from the removed liquid, which liquid is predominantly made up of oil which has leaked into collecting chamber 78 past seal ring 32. The purified oil is coupled by conduit 90 from coalescer 88 to oil sump tank 68 to be recirculated. Any water which is separated from the oil can be disposed of in any convenient manner.

Scavenge pump 84 is preferably operated continuously whenever oil pump 64 is operated, and preferably has a large enough capacity to remove liquid from collecting chamber 78 faster than liquid will collect therein, under all but exceptional conditions. Thus, liquid collecting chamber 78 will normally be empty at all times, and the small amount of oil leakage past seal ring 32 never contacts aft stern tube seal 76, thereby entirely eliminating oil leakage through seal 76. Any water which leaks into liquid collecting chamber 78 from seal 76 is also removed faster than it collects. Thus, the apparatus of this invention not only prevents oil from leaking out to the sea, but also prevents water from leaking into the bearing, and achieves these objectives even with well-used seal rings which are subjected to leakage.

The aft stern tube seal 76 used in this embodiment of the invention preferably has four resilient seal rings 92, 94, 96 and 98 which are supported by mounting rings 100, 102, 104, 106 and 108 and bear against a conventional aft shaft liner 110, with all of the seal ring lips being directed outboard. Mounting rings 100-108 are secured to the aft end of stern tube 12 by conventional means not shown.

Communicating bores 112, 114, 116, 118, 120 and 122 are formed in mounting rings 104, 106 and 108 to provice a conduit into the space 123 between seal rings 94 and 96. Filtered sea water is pumped into space 123 from the ship's sea water supply through conduit 124 (FIG. 2), filter 126, conduit 128, pump 130, conduit 132, and the bores 112-122.

The pressure developed in space 123 will be just slightly higher (e.g. 0.5 psi greater) than the external sea pressure, regardless of the ship's draft. This pressure in space 123 will build up just sufficient to lift resilient seal rings 94 and 92 from the shaft liner 110 to permit filtered water flow to the sea as indicated in FIG. 2. It will be clear from inspection of the seal ring geometry that these rings act as one-way check valves. Viewing seal assembly 76, flow is readily obtained from any inboard location outboard to the sea with only a small overpressure on the inboard side. In the opposite direction, higher outboard pressures force the seal rings tighter against the shaft liner 110. Thus, the pressure in space 123 builds up to a value just sufficiently greater than sea pressure to cause the filtered sea water to flow outboard under seal rings 94 and 92. This washes away any dirt adjacent seal rings 92-96 and cools and lubricates rings 92-96, thereby prolonging their life. This same pressure forces seal ring 96 into close contact with the liner 110, creating a seal at that point and preventing water leakage inboard.

Communicating bores 133 (FIG. 1, dotted lines) and 136 are formed in mounting rings 106 and 108 to provide a conduit into the space 144 between seal rings 96 and 98. Sea water at a pressure less than the pressure in space 123 is applied to space 144 by a sea water head tank 146 (FIG. 2), conduit 148, and bores 134-136. The sea water in space 144 lubricates the inboard side of seal ring 96 and reduces the pressure drop across seal ring 96. The pressure drop between space 144 and the low pressure in collecting chamber 78 is carried by seal ring 98, which is lubricated on its outboard side by the water in space 144. In the preferred embodiment of the invention, the pressure in space 144 is such as to cause a greater pressure drop across seal ring 96, the latter being lubricated on both sides, than across seal ring 98, the latter being only lubricated on one side. The division of pressure is controlled by the height of head tank 146. Normally, there is no circulation to or from head tank 146.

The outboard seal ring 92 is considered as a scrubber or dirt seal and is discounted for any other purpose. Thus for design purposes, the space between seal rings 92 and 94 is considered the same as the space exterior to ring 92. Thus seal ring 92 is not essential to the features of this invention.

Figure 3:
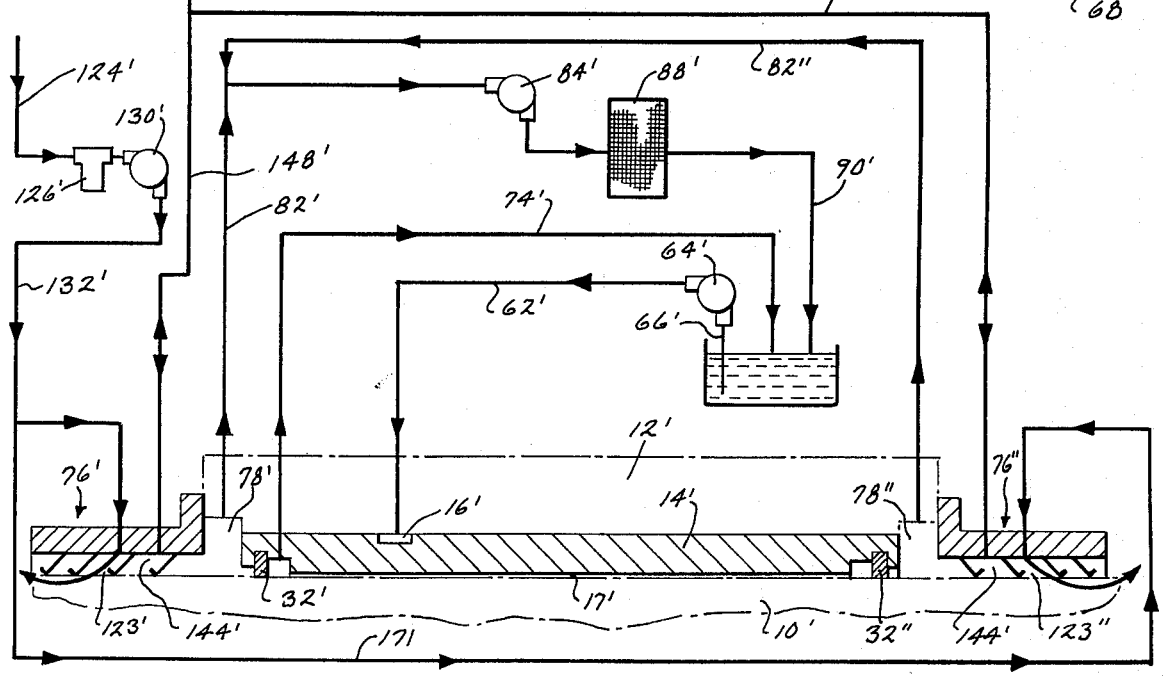
FIG. 3 is a diagrammatic view showing a modification where there is collecting at both ends of a projecting strut bearing.

In the modification disclosed in FIG. 3, all of the parts which correspond to similar parts in FIG. 2 are identified by the same reference numberal with a prime mark added and are not further described. The modification of FIG. 3 is adapted for use in special situations where there is a projecting strut on the boat with the strut bearing 14' adjacent the shaft 10', there being an annular oil film as at 17' between the shaft and bearing. In this modification the forward seals 40 and 42 of the form of the invention of FIGS. 1 and 2 are replaced by a special seal which is the same as the seal 76 of the form of the invention of FIGS. 1 and 2 except that it is reversed in position as shown in FIG. 3. This forward seal is designated 76" and it has chambers 123" and 144" which correspond to the chambers 123' and 144' at the opposite end of FIG. 3. In this form of the invention the sea water head tank 146' not only communicates through the line 148' with the annular seal space 144' but also communicates through the line 170 with the space 144" at the forward end of the strut bearing. In FIG. 3 there is an annular collecting space 78' which corresponds to the annular collection space 78 of the form of the invention of FIG. 2 but there is also a similar annular collecting space 78" at the forward end of the bearing. Fluid is withdrawn from the annular space 78' by the collecting line 82', as in the principal form of the invention, and there is another collecing line 82" which removes liquid from the collecting space 78". Thus liquid from both spaces is removed by the scavenge pump 84'. In addition, sea water from the ship's supply which enters through line 124' passes through the filter 126' and is delivered by pump 130', as in the principal form of the invention. This sea water is directed not only into the annular space 123' between seals in the aft seal, but also through the line 171 into the space 123" of the seal at the forward end of the bearing. Everything else in the modification operates the same as heretofore described, the only difference being that the ship's supply of sea water feeds special seals at both ends of the bearing instead of only at the aft end, with the sea water head tank feeding annular seal spaces at both ends of the bearing 14', and with the scavenge pump collecting leakage fluid from annular collecting spaces 78' and 78" at both ends of the bearing 14', it being noted that there is a floating bronze seal ring 32' at one end of the bearing 14' and another floating bronze seal ring 32" at the opposite end.

Summarizing the invention, it is clear that the bearing 14 is pressure lubricated by the circulating pump 64 but without the use of a head tank as is customary. The head tank is eliminated because the collecting spaces 78, 78' and 78" are at essentially O pressure. The majority of the circulating oil for the bearing is contained within the floating bronze seal rings 32, 32' and 32". Thus this oil simply circulates from the sump tank 68 to the bearing and back to the sump tank. As the pressure difference across the floating bronze rings 32, 32' and 32" is small, and inasmuch as the clearance around the shaft is small (usually about 0.010 of an inch), the oil flow past the rings 32, 32' and 32" will be a small percentage of the circulating flow. What does leak past these rings enters the spaces 78, 78' and 78". Thus these spaces form a catchall or protective spaces which are really the key to the invention. With respect to the seal assembly itself, its job is to seal water out against a pressure difference from the sea water pressure to the collecting space 78.

Referring to the form of the invention of FIGS. 1 and 2, seal ring 92 is considered as a scrubber or dirt seal as in conventional seals. Thus the space between seal rings 92 and 94 is considered the same as the space outboard of seal ring 92 as far as design purposes are concerned. Heat, foreign matter and large pressure differences across the seal rings are three of the worst enemies in seals. The design of the seal assembly of the present invention adequately takes care of these problems. With the present invention there is a pressure in space 123 which is slightly above sea pressure and a pressure in collecting space 78 which is essentially 0. A sealing ring 98 has been added to permit taking this pressure drop across two seal rings. The major portion of the pressure drop will be across seal ring 96 as it is now lubricated on both sides. The smaller portion of the pressure drop will be taken across seal ring 98. This seal ring 98 is essential, as the collecting space 78 will not guarantee lubrication of the inboard side of any seal ring adjacent to it. Thus seal ring 98 is provided to establish an annular space 144 for lubricating seal ring 96 on the inboard side and permit it to carry the major portion of the pressure drop. This division of pressures is controlled by the sea water head tank 146 which communicates with annular space 144. Normally there will be no circulation to or from the tank 146.

It is understood that I do not wish to be limited to the exact details of the construction disclosed, since obvious modifications will occur to those skilled in the art.

What I claim is:

1. In a bearing and seal assembly wherein there is a rotatable shaft and a bearing sleeve surrounding a portion of said shaft, there being oil openings in said bearing sleeve, and wherein there is means for applying oil under pressure to said oil openings to provide lubrication between said bearing sleeve and said shaft, and wherein there is a seal assembly surrounding said shaft axially spaced from said bearing sleeve, the improvement comprising means providing an annular collecting chamber around said shaft between said bearing sleeve and said seal assembly, a seal ring surrounding said shaft at the end of said bearing sleeve which is adjacent said collecting chamber, and means including a scavenge pump coupled to said annular collecting chamber to remove material from said chamber which has collected therein because of leakage past said seal ring and seal assembly.

2. A bearing and seal assembly as defined in claim 1 and further comprising oil purifier means coupled to the output of said scavenge pump to purify the oil output thereof for reuse.

3. A bearing and seal assembly as defined in claim 2 and further comprising an oil sump tank, means including an oil pump coupled between said oil sump tank and said bearing sleeve for pumping oil into said oil openings to provide lubrication between said shaft and said bearing sleeve, and means coupling the oil output of said oil purifier means to said sump tank for reuse in lubricating said bearing sleeve.

4. The bearing and seal assembly defined in claim 1 wherein said seal ring is made of metal and further comprising an annular recess in the end of said bearing sleeve adjacent to said collecting chamber for receiving said seal ring.

5. The bearing and seal assembly defined in claim 1 wherein said shaft is a ship propeller shaft and further comprising a stern tube surrounding said bearing sleeve and supporting said sleeve and said shaft, and wherein said seal assembly comprises an aft stern tube seal assembly, and further comprising a forward stern tube seal assembly surrounding a portion of said shaft at the forward end of said stern tube.

6. The bearing and seal assembly defined in claim 5 wherein said aft stern tube seal assembly comprises a plurality of resilient seal rings axially spaced along a portion of said shaft, the lip of each resilient seal ring being directed outboard, and further comprising means for pumping water into a first-mentioned annular space between two of said seal rings at a pressure higher than the sea water pressure to cool and lubricate the adjacent seal rings and to flush water outboard under the outboard seal ring to wash away dirt and other foreign material.

7. The bearing and seal assembly defined in claim 6 wherein said means for pumping water into said annular space between said two seal rings includes filter means for filtering said water.

8. The bearing and seal assembly of claim 6 and further comprising means for supplying water to an annular space which is forward of said first annular space at a pressure which is lower than the pressure of the water which is pumped into the first-mentioned space.

9. The bearing and seal assembly of claim 7 wherein there are four of said seal rings, said two seal rings between which water is pumped at a higher pressure than sea water pressure being the second and third seal rings from the aft end of said seal assembly, and said two seal rings between which water is applied at a lower pressure being the third and fourth seal rings from the aft end of said seal assembly.

10. An improved aft stern tube seal assembly for a ship propeller shaft comprising a plurality of resilient seal rings axially spaced along a portion of said shaft, the lip of each resilient seal ring being directed outboard, and means for pumping water into the annular space between two of said seal rings at a pressure higher than the sea water pressure to cool and lubricate the adjacent seal rings and to flush water outboard under the outboard seal ring to wash away dirt and other foreign material.

11. The stern tube seal defined in claim 10 wherein said means for pumping water into said annular space between said two seal rings includes filter means for filtering said water.

12. The stern tube seal assembly defined in claim 10 and further comprising means for supplying water to the annular space which is forward of said first-mentioned annular space at a pressure which is lower than the water pressure of the water which is pumped into the first-mentioned space.

13. The stern tube seal defined in claim 12 wherein there are four of said seal rings, said two seal rings between which water is pumped at a higher pressure than sea water pressure being the second and third seal rings from the aft end of said seal assembly, and said two seal rings between which water is applied at a lower pressure being the third and fourth seal rings from the aft end of said seal assembly.

14. In a marine bearing and seal assembly wherein there is a rotatable propeller shaft and a bearing sleeve surrounding a portion of said shaft, there being oil openings in said bearing sleeve, and wherein there is means for supplying oil under pressure to said oil openings to provide lubrication between said bearing sleeve and said shaft, and wherein there is a seal assembly surrounding said shaft in a position axially spaced from each end of said bearing sleeve, the improvement comprising means providing an annular collecting chamber around said propeller shaft between one end of said bearing sleeve and the seal assembly which is axially spaced from said end of the bearing sleeve, an annular collecting chamber surrounding said shaft between the opposite end of said bearing sleeve and the axially spaced seal assembly at said opposite end, a seal ring surrounding said shaft at each end of the bearing sleeve, and means including a scavenge pump coupled to both of said annular collecting chambers to remove material from said chambers which has collected therein because of leakage past said seal rings and seal assemblies.

15. The bearing and seal assembly defined in claim 14 wherein said axially spaced seal assemblies are both exposed to sea water pressure and each comprises a plurality of resilient seal rings axially spaced along said shaft, the lips of each resilient seal ring of each axially spaced seal assembly being directed away from the bearing sleeve, and further comprising means for pumping sea water into the annular space between two of said seal rings of each of the axially spaced seal assemblies at a pressure higher than the sea water pressure to cool and lubricate the adjacent seal rings and to flush water outwardly to wash away dirt and other foreign material.

16. The bearing and seal assembly defined in claim 15 and further comprising means for supplying sea water to an annular space closer to the bearing which is between two other seal rings of each of the axially spaced seal assemblies at a pressure which is lower than the pressure of the water which is pumped into the first-mentioned annular spaces between seal rings.

* * * * *